United States Patent
Narita

[11] Patent Number: 5,241,477
[45] Date of Patent: Aug. 31, 1993

[54] ADAPTIVE CORRECTION OF INAPPROPRIATE SHIFT IN AUTOMATIC TRANSMISSION

[75] Inventor: Yasushi Narita, Yokohama, Japan

[73] Assignee: Nissan Motor Company, Ltd., Yokohama, Japan

[21] Appl. No.: 979,418

[22] Filed: Nov. 19, 1992

Related U.S. Application Data

[63] Continuation of Ser. No. 626,055, Dec. 11, 1990, abandoned.

[30] Foreign Application Priority Data

Dec. 13, 1989 [JP] Japan .................................. 1-323248

[51] Int. Cl.⁵ .......................................... B60K 41/06
[52] U.S. Cl. .................................... 364/424.1; 74/866
[58] Field of Search ............... 364/424.1; 74/866, 869, 74/858, 857

[56] References Cited

U.S. PATENT DOCUMENTS

| | | | |
|---|---|---|---|
| 3,832,915 | 9/1974 | Hiramatsu | 74/869 |
| 4,680,988 | 7/1987 | Mori | 364/424.1 |
| 4,680,992 | 7/1987 | Hayasaki et al. | 74/869 |
| 4,742,461 | 5/1988 | Eschrich et al. | |
| 4,798,105 | 1/1989 | Takase et al. | 74/866 |
| 4,868,753 | 9/1989 | Mori | 364/424.1 |
| 4,922,424 | 5/1990 | Hiramatsu | 364/424.1 |
| 4,953,090 | 8/1990 | Narita | 364/424.1 |
| 4,955,259 | 9/1990 | Narita | 74/866 |
| 4,970,916 | 11/1990 | Narita | 74/866 |
| 4,982,621 | 1/1991 | Sano | 74/866 |

FOREIGN PATENT DOCUMENTS

| | | |
|---|---|---|
| 326119A1 | 8/1989 | European Pat. Off. . |
| 3436190A1 | 4/1986 | Fed. Rep. of Germany . |
| 1-21255(A) | 1/1989 | Japan . |
| 1-82660 | 7/1989 | Japan . |
| 1-182659(A) | 7/1989 | Japan . |
| 2151049 | 7/1985 | United Kingdom . |
| 2212871 | 8/1989 | United Kingdom . |

*Primary Examiner*—Jack B. Harvey
*Assistant Examiner*—Edward Pipala
*Attorney, Agent, or Firm*—Foley & Lardner

[57] ABSTRACT

An adaptive correction of an inappropriate shift operation is disclosed. During a power-off upshift, a variation in output torque of the transmission output shaft is detected. A decision is made based on this output torque variation whether or not the power-off 1-2 upshift has been effected in a predetermined appropriate manner, and a timing at which an on-coming friction device to be engaged during the power-off upshift is corrected based on the decision made. Thus, the shift operation during the next occurrence of a power-off upshift of the same type is effected in the appropriate manner.

11 Claims, 20 Drawing Sheets

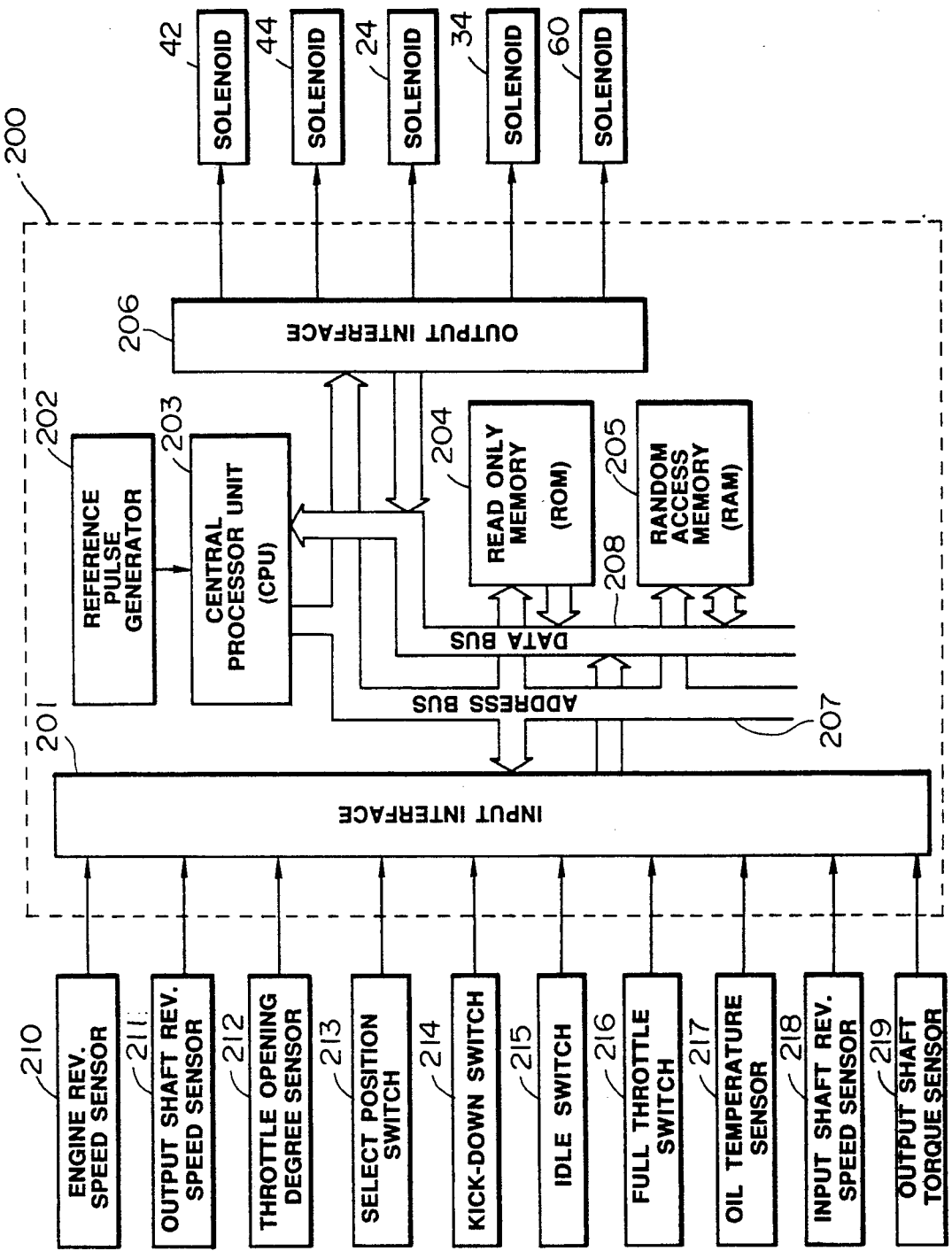

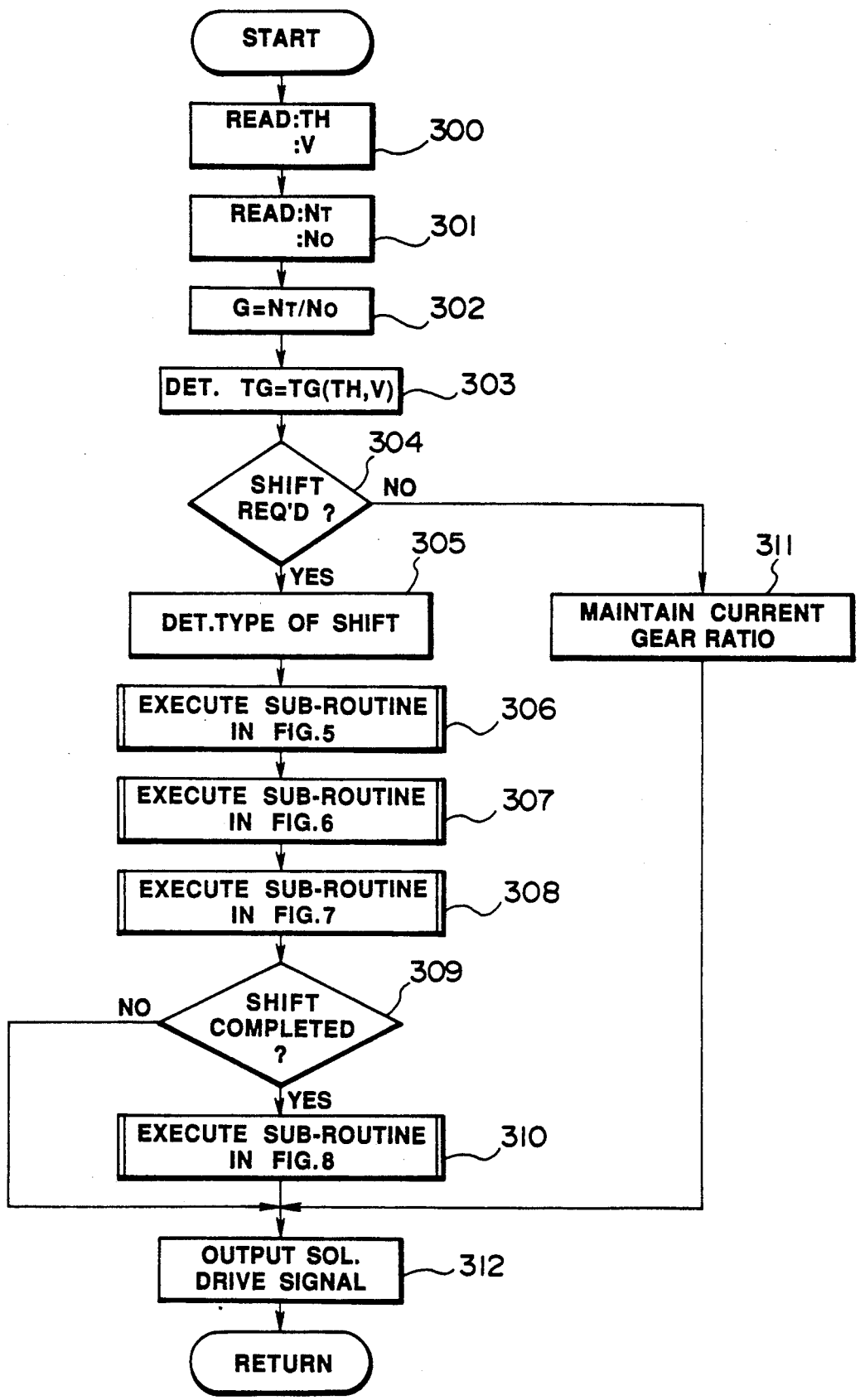

ADAPTIVE CORRECTION OF INAPPROPRIATE SHIFT IN AUTOMATIC TRANSMISSION

This application is a continuation of application Ser. No. 07/626,055, filed Dec. 11, 1990, now abandoned.

BACKGROUND OF THE INVENTION

The present invention relates to a shift control for a motor vehicle automatic transmission, and more particularly to an adaptive correction of in appropriate shift in an automatic transmission.

U.S. patent application Ser. No. 07/301,352 filed on Jan. 25, 1989 or the corresponding European Patent Application No. 89 101 294.0 (publication No. 0326119) disclose a shift control for a motor vehicle automatic transmission. According to this known shift control, the switching timings of shift solenoids for a power-off 1-2 upshift are determined after comparing the gear ratio with gear ratio values derived from predetermined switching timing tables, or after comparing a time elapsed from the issuance of command for a power-off 1-2 upshift with time values derived from predetermined switching timing tables.

Since the data in the above-mentioned switching tables are fixed, an inappropriate shift operation occurs if the speed at which the engine decreases its speed deviates from the initially set value owing to aging of the engine.

An object of the present invention is to provide an adaptive correction of such inappropriate shift in an automatic transmission.

SUMMARY OF THE INVENTION

According to one aspect of the present invention, there is provided a method of adaptive correction of an inappropriate shift in a motor vehicle automatic transmission, the method comprising the steps of deriving information regarding variation in an output torque of the automatic transmission during a power-off upshift; and correcting the progress of shift operation during the next occurrence of a power-off upshift of the same type in accordance with said information derived.

According to another aspect of the present invention, there is provided a system for an adaptive correction of an inappropriate shift in a motor vehicle automatic transmission, comprising means for deriving a variation in an output torque of an output shaft of the automatic transmission during a power-off upshift; means for effecting an engagement of an on-coming friction device during the power-off upshift; and a control unit including means for deciding based on said variation in said output torque detected whether or not the power-off upshift has been effected in a predetermined appropriate manner, said control unit also including means for correcting the progress of the shift operation during the next occurrence of a power-off upshift of the same type.

BRIEF DESCRIPTION OF THE DRAWINGS

FIG. 3 is a block diagram of a microcomputer based automatic transmission control unit in operative connection with sensors and switches and with solenoids;

FIG. 4 is a flow diagram of a main routine used in a first embodiment according to the present invention;

DETAILED DESCRIPTION OF THE INVENTION

Figure 1:
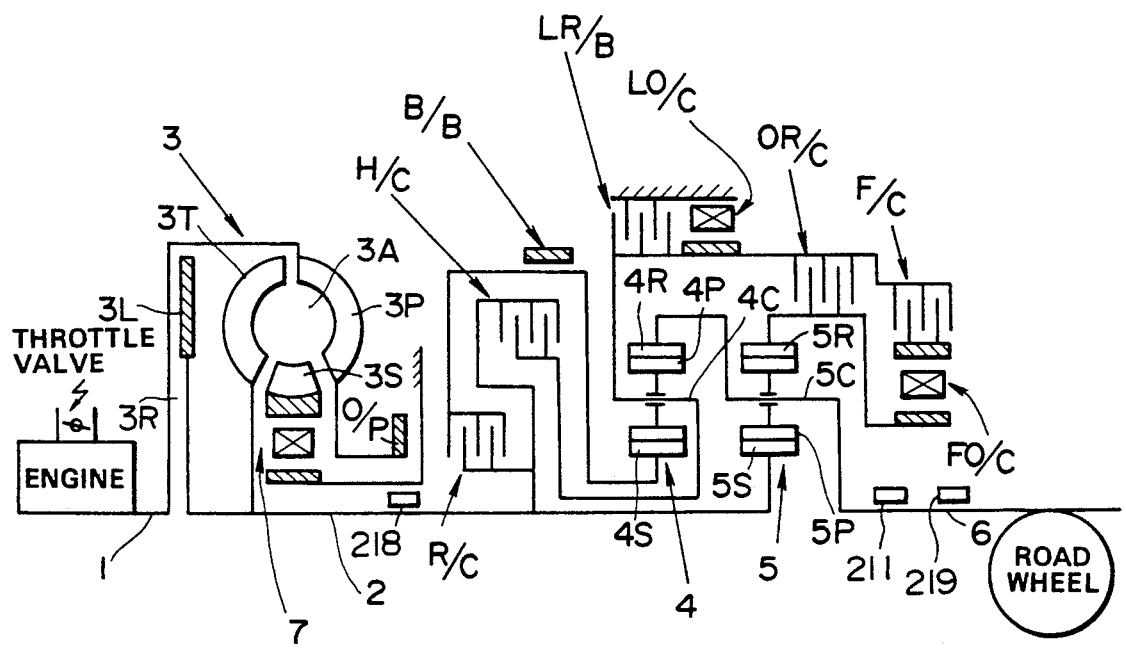
FIG. 1 is a schematic view of a motor vehicle power train including an automatic transmission.
Figure 2A:
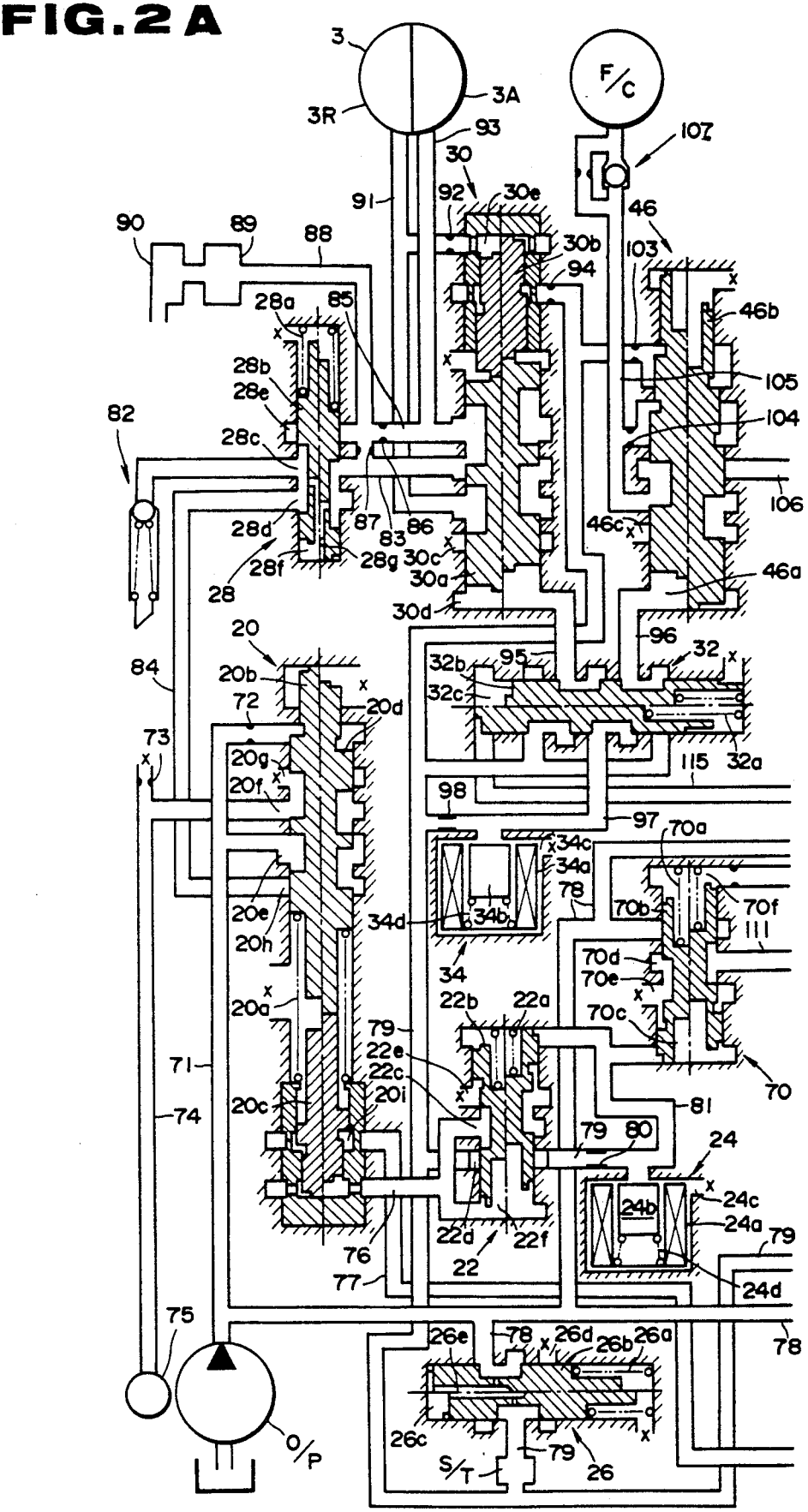
FIGS. 2A, 2B, and 2C, when combined side by side, show a hydraulic circuit diagram of a control valve assembly of the automatic transmission.
Figure 2B:
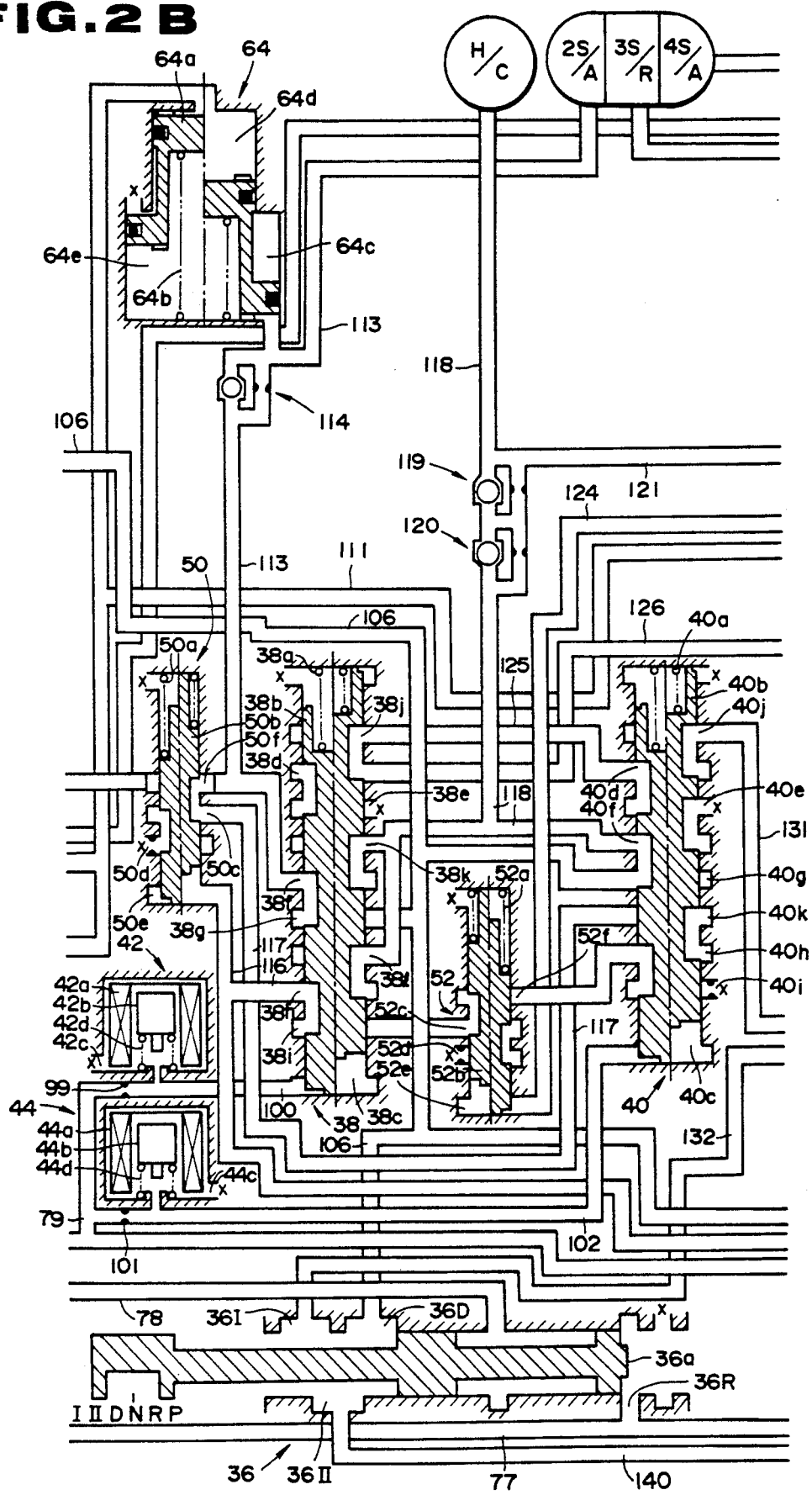
Figure 2C:
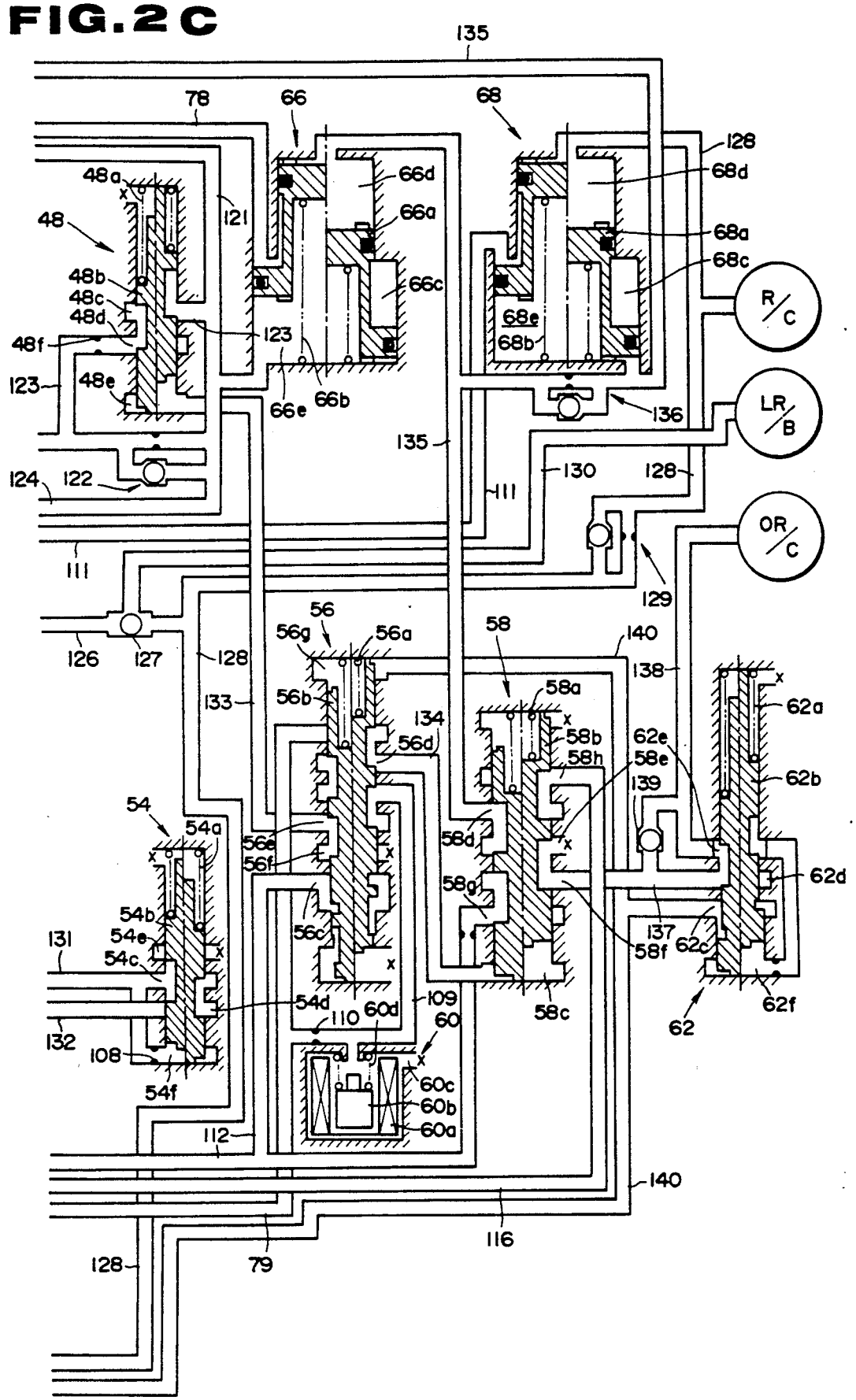

FIG. 1 is a schematic diagram showing a motor vehicle power train which the present invention is applied to. FIGS. 2A, 2B, and 2C illustrate a hydraulic circuit of a control valve assembly. FIG. 3 is a block diagram of an automatic transmission (A/T) control unit.

The motor vehicle power train includes a known automatic transmission of the RE4R01A type described in a publication "NISSAN FULL-RANGE AUTOMATIC TRANSMISSION RE4R01A TYPE, SERVICE MANUAL, (A261C07)" issued on March, 1987 by NISSAN MOTOR COMPANY LIMITED. The automatic transmission of this known type is also described in U.S. Pat. No. 4,680,992 (Hayasaki et al.) which is hereby incorporated in its entirety by reference.

Referring to FIG. 1, in order to detect a revolution speed of a turbine or input shaft 2, an input shaft revolution speed sensor 218 is arranged. An output shaft revolution speed sensor 211 is arranged to detect a revolution speed of an output shaft 6, and a torque sensor 219 is arranged to detect a torque of the output shaft 6.

For detailed description of the automatic transmission shown in FIG. 1, reference should be made to description of FIG. 2 of the above-mentioned U.S. Pat. No. 4,680,992. The hydraulic circuit of the control valve assembly illustrated in FIGS. 2A, 2B, and 2C is the same as a hydraulic circuit illustrated in FIGS. 1A, 1B, and 1C of the above-mentioned U.S. Pat. No. 4,680,992. Thus, for detailed description of FIGS. 2A, 2B, and 2C, reference should be made to this U.S. Patent.

Briefly, in FIG. 1, an on-coming friction device which is to be engaged during a power-off 1-2 upshift is a second brake B/B. Further, in FIGS. 2A, 2B, and 2C, first and second shift solenoids 42 and 44, and a line pressure solenoid 24 are shown. A 1-2 accumulator 64 is arranged which has an accumulator piston 64a slidably disposed in a fluid tight manner in a differential diameter bore to define, on one end, an accumulator chamber 64e which forms a part of a hydraulic circuit (113, 114, 38) that allows supply of a servo activating hydraulic fluid pressure to a second servo apply chamber 2S/A of the second brake B/B after the occurrence of a requirement (or command) for a 1-2 upshift. At an appropriate switching timing after the occurrence of the requirement for 1-2 upshift, a 1-2 shift valve 38 shifts to an upshift position in response to a change in status of the shift solenoid 42 from the ON state to the OFF state. This causes a gear ratio to vary from the present gear ratio for the first gear position toward a new gear ratio for the second gear position.

Referring back to the 1-2 accumulator 64, the accumulator piston 64a defines, on the opposite side, an accumulator back-up pressure chamber 64d. An accumulator control valve 70 is provided which generates an accumulator back-up pressure supplied to the back-up pressure chamber 64d. The level of the back-up pressure is determined in response to a signal fluid pressure applied via a hydraulic fluid line 81 (see FIG. 2A). The same signal fluid pressure is applied to a pressure modifier valve 22 which in turn modulates the operation of a line pressure regulator valve 20. The level of the signal fluid pressure is controlled by the line pressure solenoid 24. More specifically, the line pressure solenoid 24 effects pressure regulation on a constant pilot pressure supplied by a pilot valve 26 by controlling the rate at which the hydraulic fluid is drained from the hydraulic fluid line 81.

As shown in FIG. 3, the shift solenoids 42 and 44, line pressure solenoid 24, lock-up solenoid 34, and overrunning clutch solenoid 60 are controlled in response to outputs of the microcomputer based A/T control unit 200.

The A/T control unit 200 includes an input interface 201, a reference pulse generator 202, a CPU (central processing unit) 203, a ROM (read only memory) 204, a RAM (random access memory) 205 and an output interface 206. These components are connected through an address bus 207 and a data bus 208.

The A/T control unit 200 receives sensor signals from engine speed sensor 210, output shaft speed sensor 211, throttle opening degree sensor 212, select position switch 213, kickdown switch 214, idle switch 215, full throttle switch 216, oil temperature sensor 217, input shaft speed sensor 218 and output shaft torque sensor 219.

The A/T control unit 200 controls the switching timings of first and second shift solenoids 42 and 44 in such a manner as described in connection with the following flow diagrams.

Referring to FIGS. 4 to 11, the first embodiment according to the present invention is described.

Figure 11:
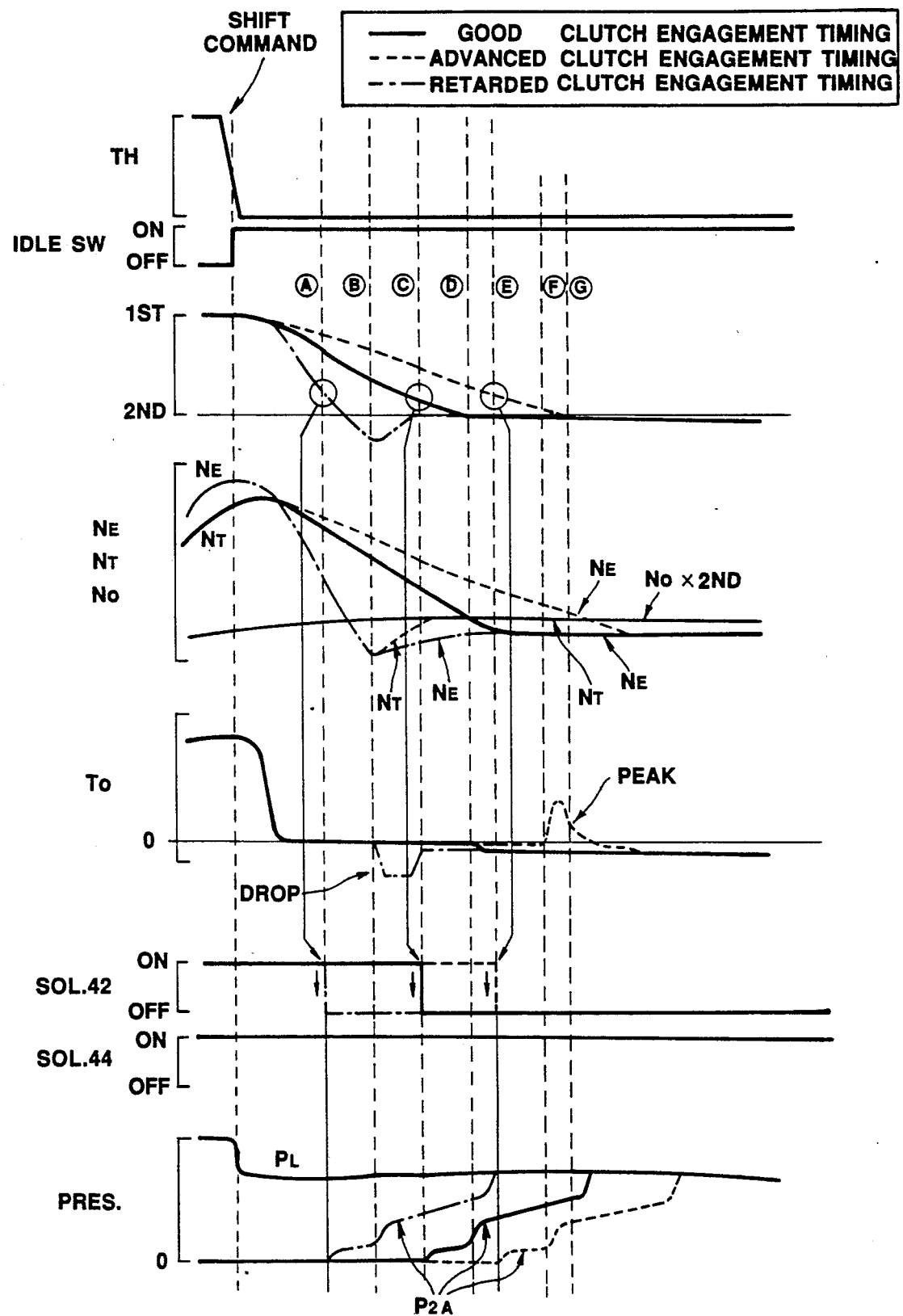
FIG. 11 is a time sequence illustrating a power-off 1-2 upshift.

Referring to FIG. 11, a power-off 1-2 upshift is described. In FIG. 11, fully drawn curves illustrate a preferrable shift due to engagement of on-coming clutch at good clutch engagement timing. As seen from the fully drawn curve illustrating variation in output shaft torque $T_O$, there occurs no torque peak nor torque drop. Broken line curves illustrate a less preferrable shift due to engagement of on-coming clutch at advanced clutch engagement timing. This shift is accompanied by a torque peak in output shaft torque $T_O$. Lastly, one-dot-chain line curves illustrate a less preferable shift due to engagement of on-coming clutch at retarded clutch engagement timing. This shift is accompanied by a torque drop in output shaft torque $T_O$.

Figure 7:
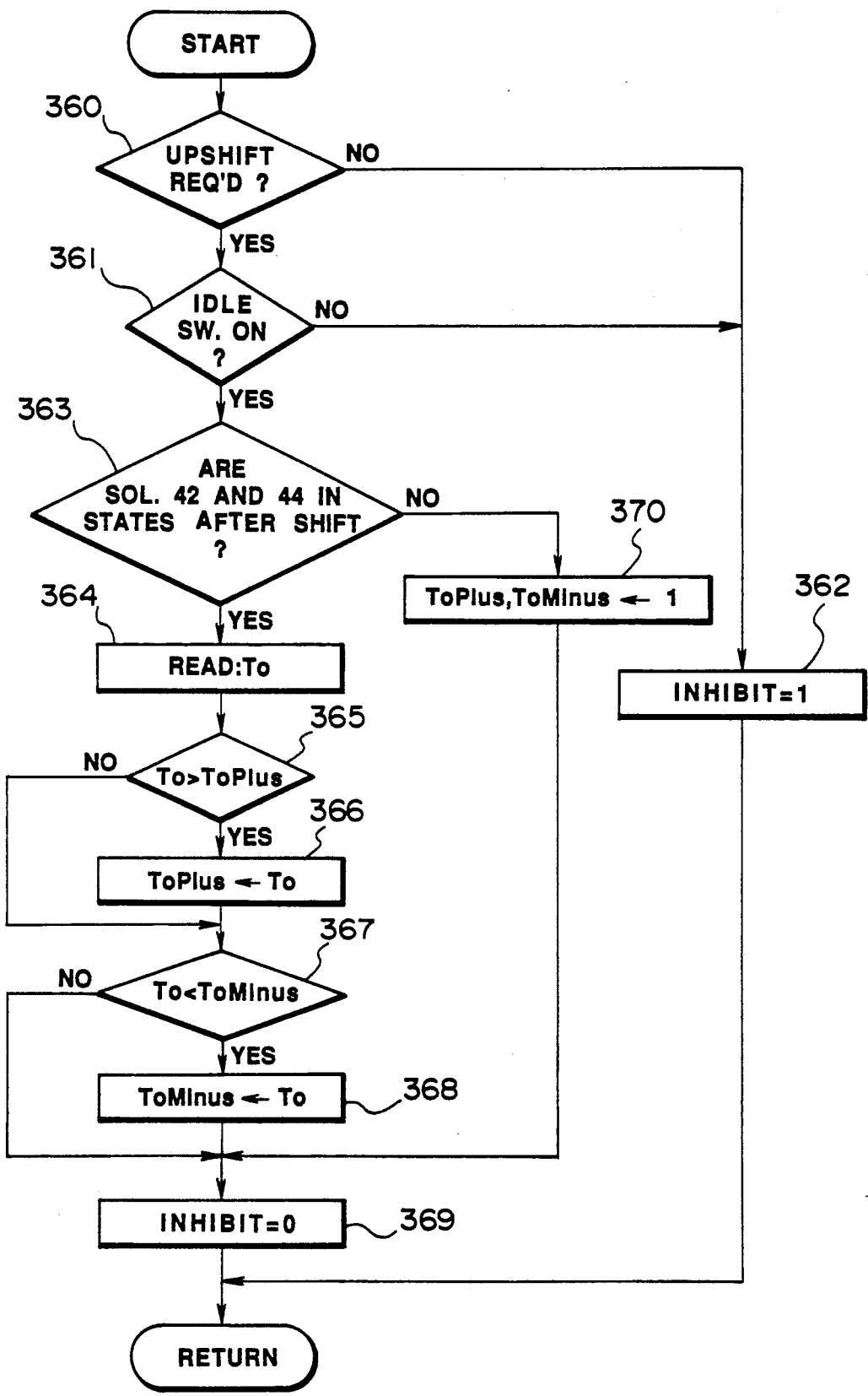
FIG. 7 is a sub routine for sampling output torque during a power-off upshift.

Briefly describing the first embodiment, during a power-off upshift, the maximum ($T_O$Plus) and the minimum ($T_O$Minus) of the output shaft torque $T_O$ are determined on output shaft torque variation after the shift solenoids 42 and 44 have switched to new states to be established after this upshift (see sub-routine shown in FIG. 7). After completion of this power-off upshift, the maximum and the minimum of the output shaft torque are used to determine whether the torque peak or torque down as illustrated in FIG. 11 occurred during the power-off upshift or not, and a correction value (delta g) is decreased by a predetermined value (delta g') if the torque peak is found, while the correction value is increased by the predetermined value if the torque drop is found (see learning routine shown in FIG. 8). This correction value (delta g) is used to correct gear ratio timing data and the clutch engagement timing of the next occurrence of the same power-off upshift is determined on the gear ratio timing data corrected (see routine shown in FIG. 5). As a result, the clutch engagement timing is retarded if the torque peak is found since it is considered that the torque peak is caused by advanced clutch engagement timing, and it is advanced if the torque drop is found since the torque drop is caused by retarded clutch engagement timing.

The first embodiment is further described along with the main routine of FIG. 4, the sub routines of FIGS. 5 to 8, and the timing data tables for 1-2 upshift.

The main routine of FIG. 4 is executed in the A/T control unit 200 at uniform intervals of a short time (for example, 5 msec). In steps 300 and 301, the throttle opening degree TH, the vehicle speed V, the turbine or input shaft speed $N_T$, and the transmission output shaft speed $N_O$ are read. In step 302, a ratio G, called a gear ratio, of the input shaft speed to the output shaft speed is calculated as $G = N_T/N_O$.

In step 303, a target gear ratio is determined after a table look-up operation of a shift point mapping, not shown, using the throttle opening degree TH and the vehicle speed V stored in step 300. In decision step 304, a determination is made as to whether a ratio shift is required or not.

If a ratio shift is required, the program proceeds to steps 305 to 310. Otherwise, the program proceeds to step 311 where the current gear ratio is maintained. In step 312, the current solenoid drive signal is maintained or held.

Figure 5:
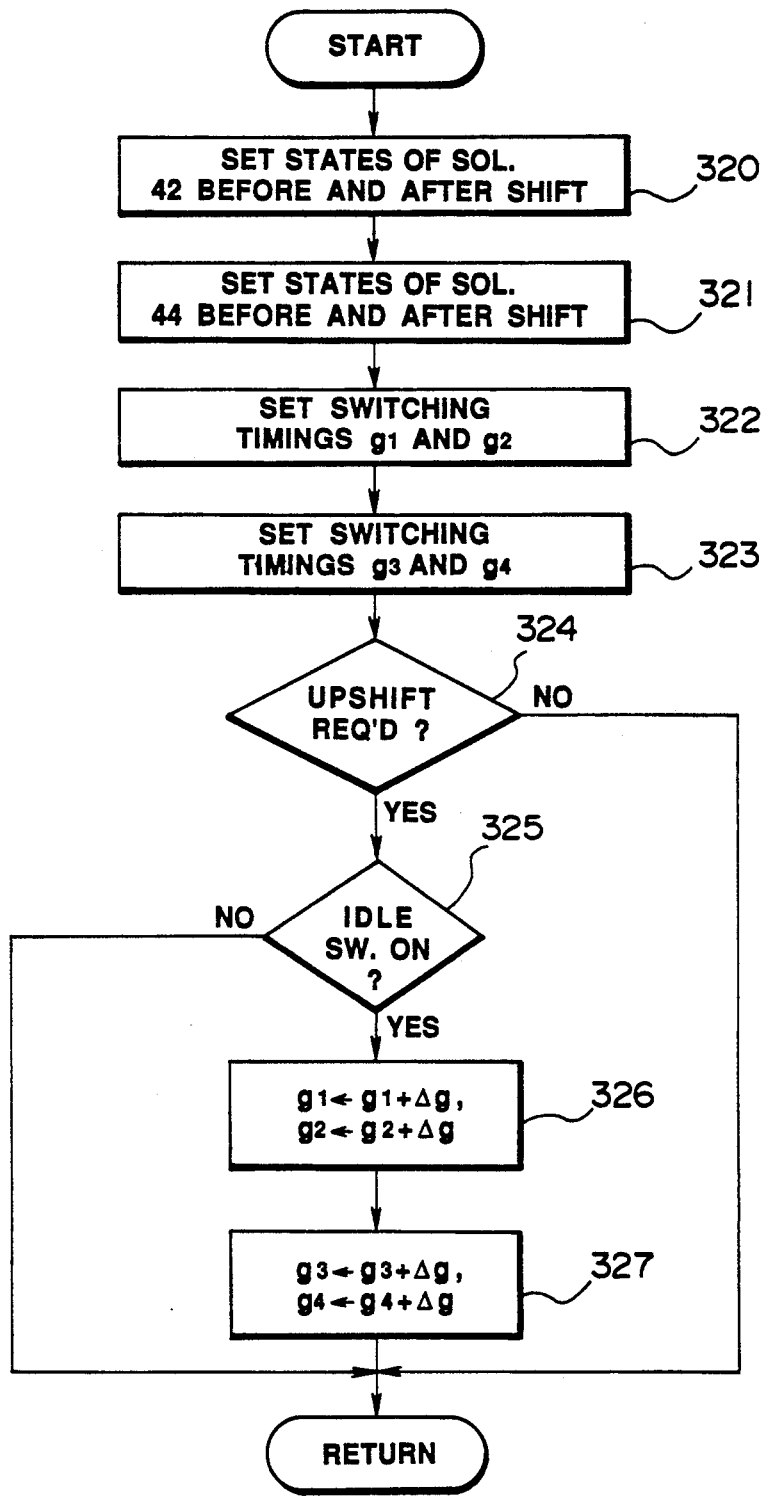
FIG. 5 is a sub routine for correcting timing data with a correction value (delta g)
Figure 6:
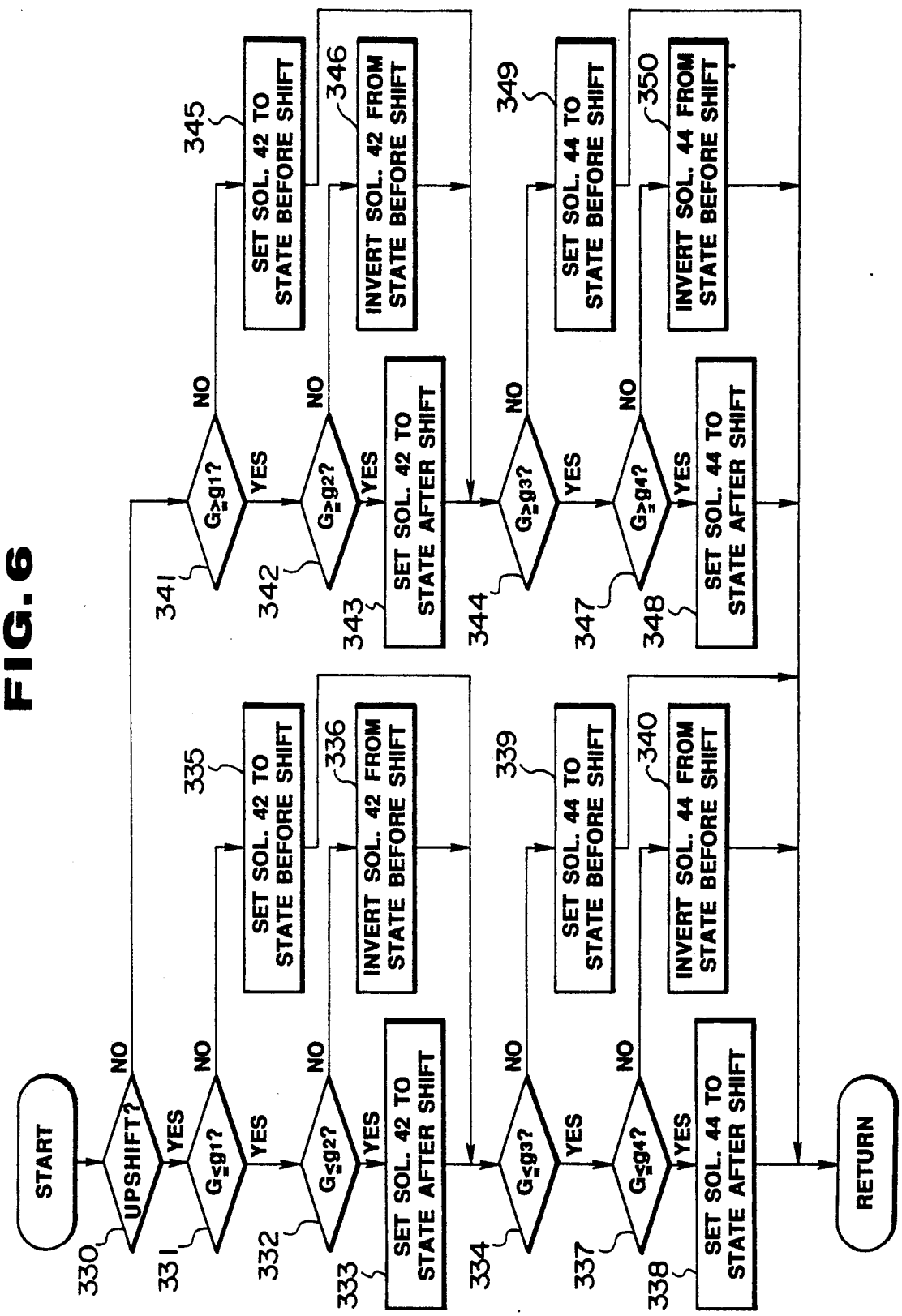
FIG. 6 is a sub routine for setting states to be assumed by shift solenoids.

In step 305, the sub routine of FIG. 5 is executed to set states of the shift solenoids 42 and 44 before and after the shift required, and shift timings thereof, and correct the shift timings in accordance with the correction value delta g if the shift required is a power-off upshift. In step 307, the sub-routine of FIG. 6 is executed to determine which one of two states, namely ON and OFF states, each of the shift solenoids 42 and 44 should assume after comparing the gear ratio G calculated in step 302 with the shift timings determined after execution of sub-routine of FIG. 5 is step 306. In step 308, the sub-routine of FIG. 7 is executed to determine the maximum and minimum of the output torque $T_O$ after the shift solenoids 42 and 44 have switched to new states after the shift. The maximum and minimum of the output shaft torque $T_O$ are used later to evaluate the quality of the shift in the sub routine of FIG. 8.

Figure 8:
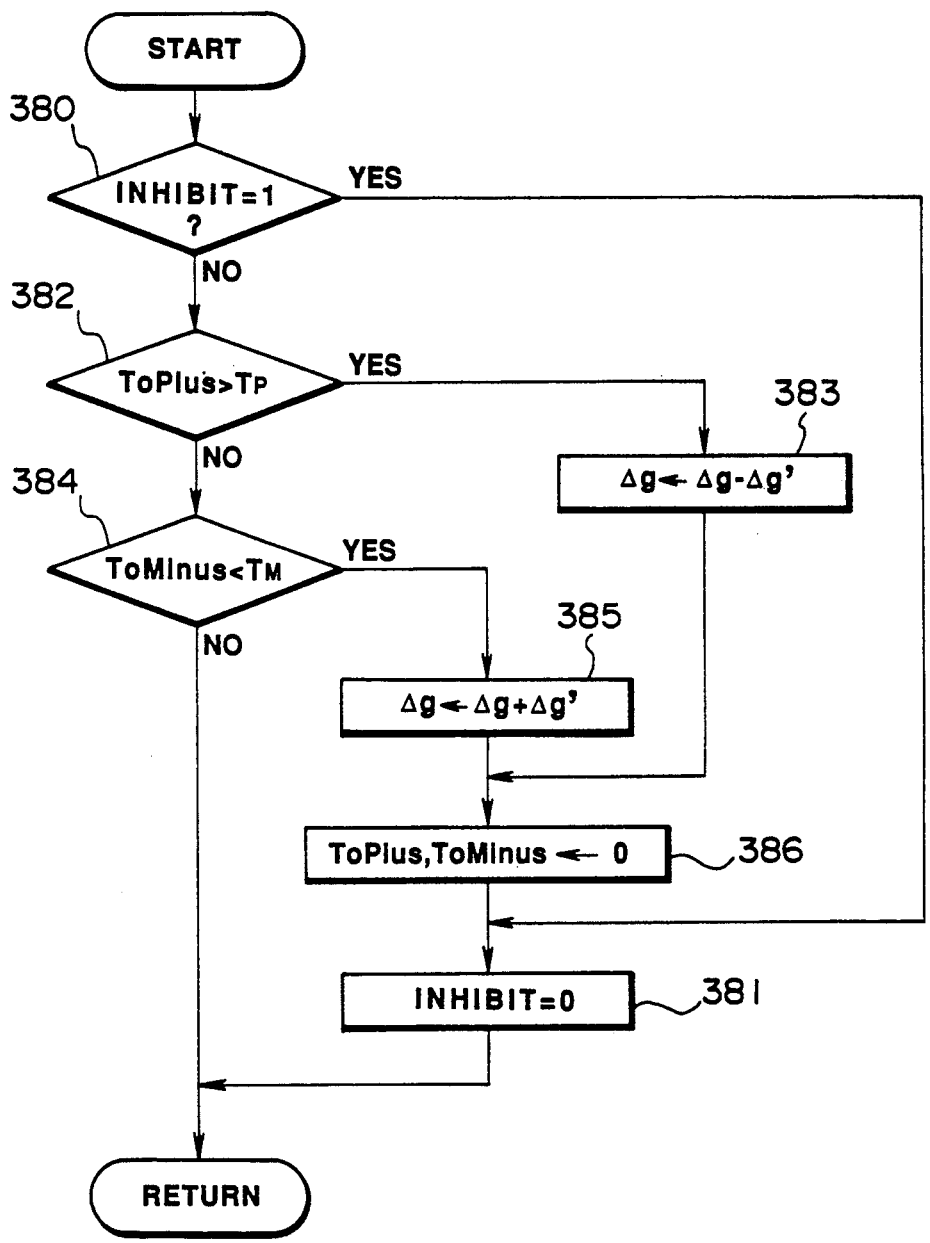
FIG. 8 is a sub routines for correcting the correction value (delta g)

In decision step 309 of FIG. 4, a determination is made as to whether or not the ratio shift has been completed. If the ratio shift has not been completed, then the program proceeds to step 312 where drive signals are outputted to solenoids 42 and 44. The solenoid drive signals are determined based upon the states determined in the sub routine of FIG. 6 (step 307). If the ratio shift has been completed, then the program proceeds to the step 310 where the sub routine of FIG. 8 is executed to correct the correction value delta g based upon the result of decision whether or not the ratio shift just completed has been made in a desired manner.

In this embodiment, the determination made at the step 309 as to whether or not the ratio shift has been completed is made by the use of a timer. It is estimated that the gear change has been completed when a predetermined time has passed since a determination made at the step 304 that the shift is required.

Referring to FIG. 5, the sub-routine is explained. In step 320, the states of the first shift solenoid 42 before and after the shift required are set. In step 321, the states of the second shift solenoid 44 before and after the shift required are set.

Following this, in step 322, the values g1 and g2 of the switching timing of the first shift solenoid 42 are set. Similarly, in step 323, the values g3 and g4 of the switching timing of the second shift solenoid 44 are set.

Figure 9:
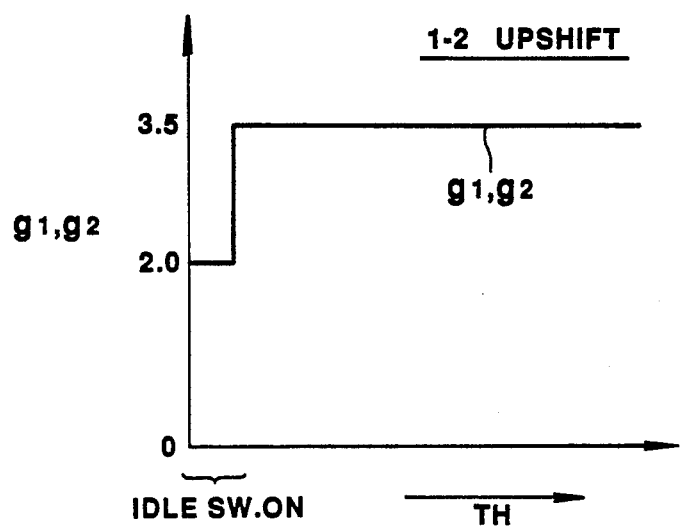
FIGS. 9 and 10 are graphical representations of switching timing data tables for a 1-2 upshift used in the sub routine shown in FIG. 6.
Figure 10:
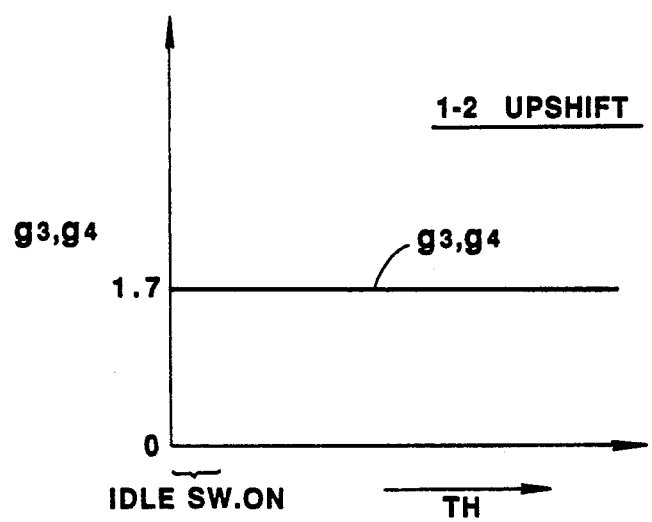

If, for example, a 1-2 upshift is required, the switching timing values g1 and g2 are given by performing a table look-up operation of a table shown in FIG. 9 and the switching timing values g3 and g4 are given by performing a table look-up operation of a table shown in FIG. 10.

In decision step 324, a determination is made as to whether or not the shift required is an upshift, and in step 325, a determination is made as to whether or not the idle switch 215 (see FIG. 3) is ON. If the shift required is not an upshift or the idle switch 215 is OFF when the shift required is an upshift, the sub routine is ended and the control returns to the main routine of FIG. 4.

If an upshift is required and the idle switch is ON, that is, if there is a demand for an upshift with the accelerator pedal being released, the program proceeds to steps 326 and 327 where correction of the switching timing values g1, g2, g3, and g4 is made by increasing them by a correction value delta g. This correction value delta g is determined by executing the sub routine of FIG. 8. After executing the step 327, the control returns to the main routine of FIG. 4.

Referring to FIG. 6, the sub routine is explained. In step 330, a determination is made as to whether or not the shift required is an upshift. If the upshift is required, the program proceeds to step 331 where a determination is made as to whether or not the actual gear ratio G is equal to or less than the value g1 ($G \leq g1$).

If $G \leq g1$, the program proceeds to step 332 where a determination is made as to whether or not the gear ratio G is equal to or less than the value g2 ($G \leq g2$). If $G \leq g2$, the program proceeds to step 333 where the first shift solenoid 42 is changed to the state after the shift. Following this, the program proceeds to step 334.

If the gear ratio G is greater than the value g1, the program proceeds from step 331 to step 335 where the first shift solenoid is set to the state before the shift. Following this, the program proceeds to step 334. If the gear ratio G is greater than the value g2, the program proceeds from step 332 to step 336 where the state of the first shift solenoid 42 is inverted from the state before the shift. Following this, the program proceeds to step 334.

It is to be noted that the shift solenoid is inverted when its state switches to the ON state if it was in the OFF state or when its state switches to the OFF state if it was in the ON state.

In step 334, a determination is made as to whether or not the gear ratio G is equal to or less than the value g3 ($G \leq g3$). If the gear ratio G is equal to or less than the value g3, the program proceeds to step 337 where a determination is made as to whether or not the gear ratio G is equal to or less than the value g4 ($G \leq g4$). If the gear ratio G is equal to or less than the value g4, the program proceeds to step 338 where the second shift solenoid 44 is set to the state after the shift.

If the gear ratio G is greater than the value g3, the program proceeds from step 334 to step 339 where the second shift solenoid 44 is set to the state before the shift. If the gear ratio G is greater than the value g4, the program proceeds from step 337 to step 340 where the state of the second shift solenoid 44 is inverted from the state before the shift.

If the shift required is not an upshift, a downshift is required and the program proceeds from step 330 to steps 341–350.

It is to be noted that the steps 341–350 are substantially the same as the steps 330–340 except that the directions of the inequality signs in steps 331, 332, 334 and 337. Therefore, the detailed description of these steps is hereby omitted.

FIG. 7 is a flow diagram showing a routine to sample the maximum and minimum of the output shaft torque. The maximum and minimum torques are used in the sub routine of FIG. 8 to be described later.

In step 360 of FIG. 7, a determination is made as to whether or not the shift required is an upshift. If an upshift is required, the program proceeds to step 361 where a determination is made as to whether or not the idle switch 215 is ON. If the shift required is not an upshift or the idle switch 215 is OFF when the shift required is not an upshift, the program proceeds to step 362 where a learning inhibitory flag INHIBIT is set equal to 1. Following this, this sub routine ends.

If an upshift is required and the idle switch 215 is ON, a power-off upshift is required with the accelerator pedal being released and the program proceeds to step 363 where a determination is made as to whether or not the first and second shift solenoids 42 and 44 have switched to their states after the shift. If they have switched, the program proceeds to step 364 where the torque $T_O$ of the output shaft of the automatic transmission is read.

Following this, the program proceeds to the steps 365–368 where discriminations related to the output shaft torque $T_O$ are made.

That is, in step 365, a determination is made as to whether or not the output shaft torque $T_O$ is greater than the last value $T_O$Plus ($T_O > T_O$Plus). If this inquiry results in affirmative, the program proceeds to step 366 where the new value $T_O$ is set for the last value $T_O$Plus and then the program proceeds to step 367. If the value $T_O$ is less than the last value $T_O$Plus, the program passes step 366 and proceeds to step 367. In step 367, a determination is made as to whether or not the value $T_O$ is less than a value $T_O$Minus ($T_O < T_O$Minus). If this inquiry results in affirmative, the program proceeds to step 368 where the value $T_O$ is set for the value $T_O$Minus and then the program proceeds to step 369. If the value $T_O$ is greater then the value $T_O$Minus, the program passes the step 368 and proceeds to step 369.

After repeating execution of steps 365-368, the maximum and minimum of the output shaft torque are given by and stored as $T_O$Plus and $T_O$Minus, respectively. The maximum and minimum of the output shaft torque are used in the sub routine of FIG. 8.

If the first and second shift solenoids 42 and 44 have not switched yet (step 363), the program proceeds from the step 363 to the step 370 where $T_O$Plus and $T_O$Minus are set equal to 0 and then the program proceeds to step 369. In step 369, the learning inhibitory flag INHIBIT is cleared to 0 and this sub routine ends.

The reason why the torque $T_O$ of the output shaft of the automatic transmission is read after the shift solenoids 42 and 44 have switched to the states after the shift is to avoid sampling of the data during the time period from the command for shift to the moment when the shift solenoids 42 and 44 have switched.

FIG. 8 is a flow diagram showing a learning routine for correcting the correction value delta g which is used in correcting the switching timing values g1 to g4 in the sub routine of FIG. 5. The sub routine is executed once after the completion of the shift.

In step 380 of this routine, a determination is made as to whether or not the learning inhibitory flag INHIBIT set in the sub routine of FIG. 7 is 1. If the learning inhibitory flag INHIBIT is 1, the program proceeds to step 381 where the learning inhibitory flag INHIBIT is cleared. Following this, the program is returned.

If the learning inhibitory flag INHIBIT is not 1, the program proceeds from step 380 to step 382. In step 382, a determination is made as to whether or not the maximum $T_O$Plus is greater than a predetermined value TP ($T_O$Plus>TP). If $T_O$Plus is greater than TP, it is considered that the timings at which the shift solenoids 42 and 44 switched are too early and the program proceeds to step 383 where the correction value delta g is decreased by a predetermined value delta g'. The predetermined value is 0.1 in terms of a gear ratio in this embodiment.

Since the correction value delta g decreased is used for the next occurrence of a power-off upshift of the same type (see steps 326 and 327 in FIG. 5), the switching timings of which the shift solenoid 42 and 44 are retarded.

If the maximum $T_O$Plus is equal to or less than the value TP, the program proceeds from step 382 to step 384 where a determination is made as to whether or not the minimum $T_O$Minus is less than a predetermined value TM. If the minimum $T_O$Minus is equal to or greater than the value TM, the program end.

If the minimum $T_O$Minus is less than the value TM, it is considered that the timings at which the shift solenoids 42 and 44 switched were delayed and the program proceeds to step 385 where the correction value delta g is increased by the predetermined value delta g'.

Since the correction value delta g increased is used for the next occurrence of a power-off upshift of the same type (see steps 326 and 327 in FIG. 5), the switching timings of the shift solenoid 42 and 44 are advanced.

The program proceeds from step 383 or 385 to step 386 where the values $T_O$Plus and $T_O$Minus are cleared and then to step 381 where the learning inhibitory flag INHIBIT is cleared. Following this, the program ends.

With the shift control of this embodiment, a power-off 1-2 upshift is optimized as will be readily understood from FIG. 11.

Referring to FIG. 11, if the maximum $T_O$Plus of the output shaft torque during operation of a power-off 1-2 upshift is greater than the value TP as shown by the broken line curve of $T_O$, the switching timing at which the first shift solenoid 42 switches from its ON state to its OFF state is retarded to a position E during the next occurrence of the power-off 1-2 upshift, while if the minimum $T_O$Minus of the output shaft torque is less than the value TM as shown by the one-dot chain line curve of $T_O$, the switching timing of the first shift solenoid 42 is advanced to a position A during the next occurrence of the power-off 1-2 upshift.

Since the switching timing of the first shift solenoid 42 is retarded if the maximum $T_O$Plus is greater than the value TP, the timing at which the second speed pressure P2A rises is retarded as shown in the hydraulic pressure characteristic curve to retard the timing at which the on-coming friction device, namely, the band brake B/B, is engaged. Since the switching timing of the first shift solenoid 42 is advanced if the minimum $T_O$Minus is less than the value TM, the timing at which the band brake B/B is engaged is advanced.

In the first embodiment previously described, the switching timings of the shift solenoids 42 and 44 are determined by comparing the gear ratio G with data g1, g2, g3, and g4 which are expressed in terms of gear ratio values, respectively. Alternatively, the switching timings of the shift solenoids 42 and 44 may be determined by comparing the time elapsed since the first occurrence of requirement of a shift with data T1, T2, T3, and T4 which are expressed in terms of time values, respectively.

The second embodiment is described referring to FIGS. 1 to 3, FIG. 7, and FIGS. 12 to 17. In the second embodiment, the time elapsed since the first occurrence of requirement of a shift is compared with timing data T1, T2, T3, and T4 which are expressed in terms of time values, respectively, and given out of data tables as shown, for example, in FIGS. 16 and 17.

Figure 12:
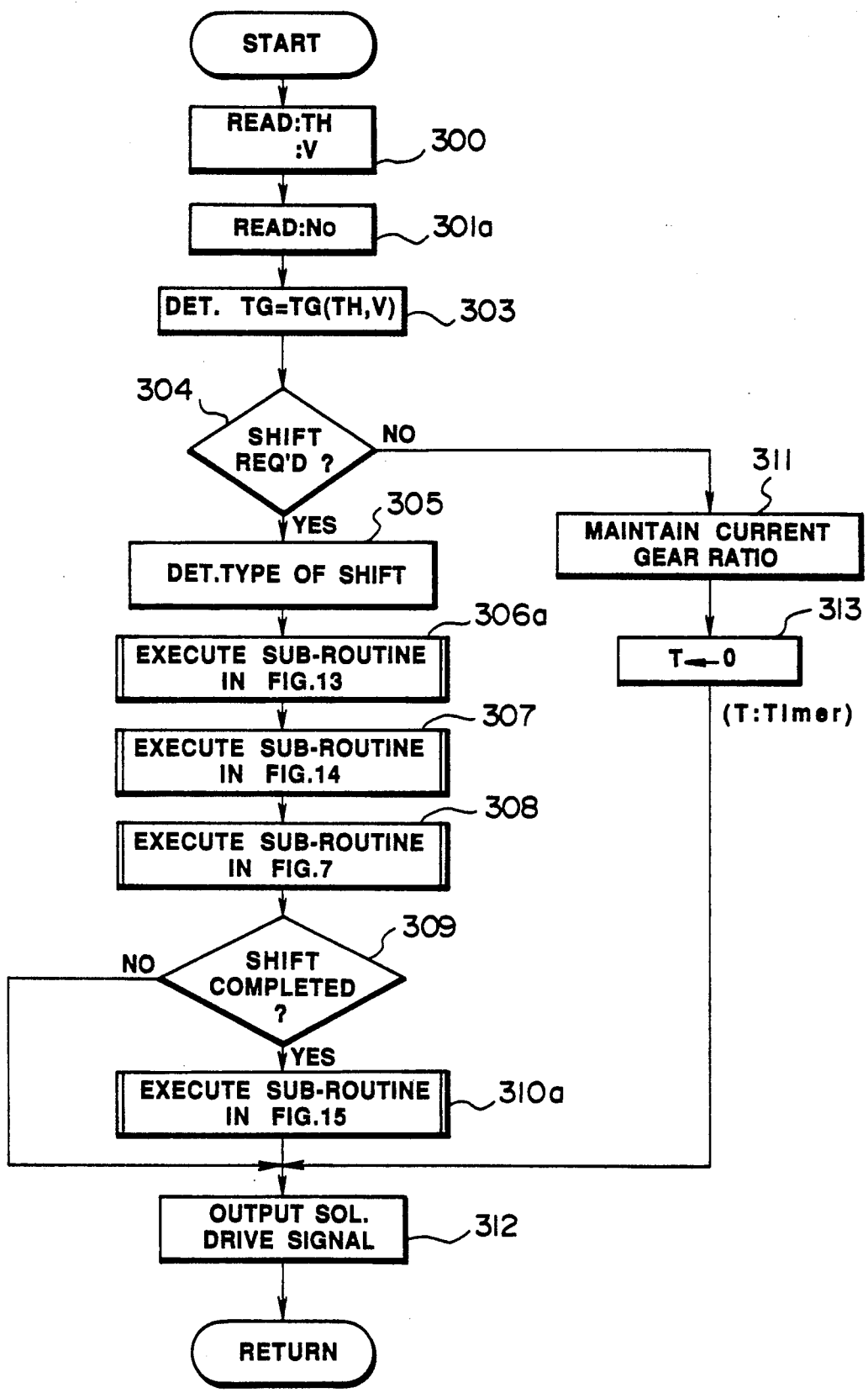
FIG. 12 is a flow diagram of a main routine used in a second embodiment according to the present invention.

The flow diagram shown in FIG. 12 corresponds to the flow diagram shown in FIG. 4 used in the first embodiment. However, the flow diagram of FIG. 12 is different from the flow diagram of FIG. 4 in that the output shaft speed $N_O$ is read in step 301a which has replaced steps 301 and 302, the content of timer T is cleared in step 313 which is added to step 311, and sub routines of FIGS. 13, 14, 7, and 15 are executed in steps 306a, 307, 308, and 310a, respectively, which have replaced steps 306, 307, 308, and 310.

The other steps are substantially the same as the steps of the flow diagram of FIG. 4. Like numerals have been applied with respect to the equivalent steps shown in FIG. 4, and the detailed description is omitted to avoid duplicity.

Figure 13:
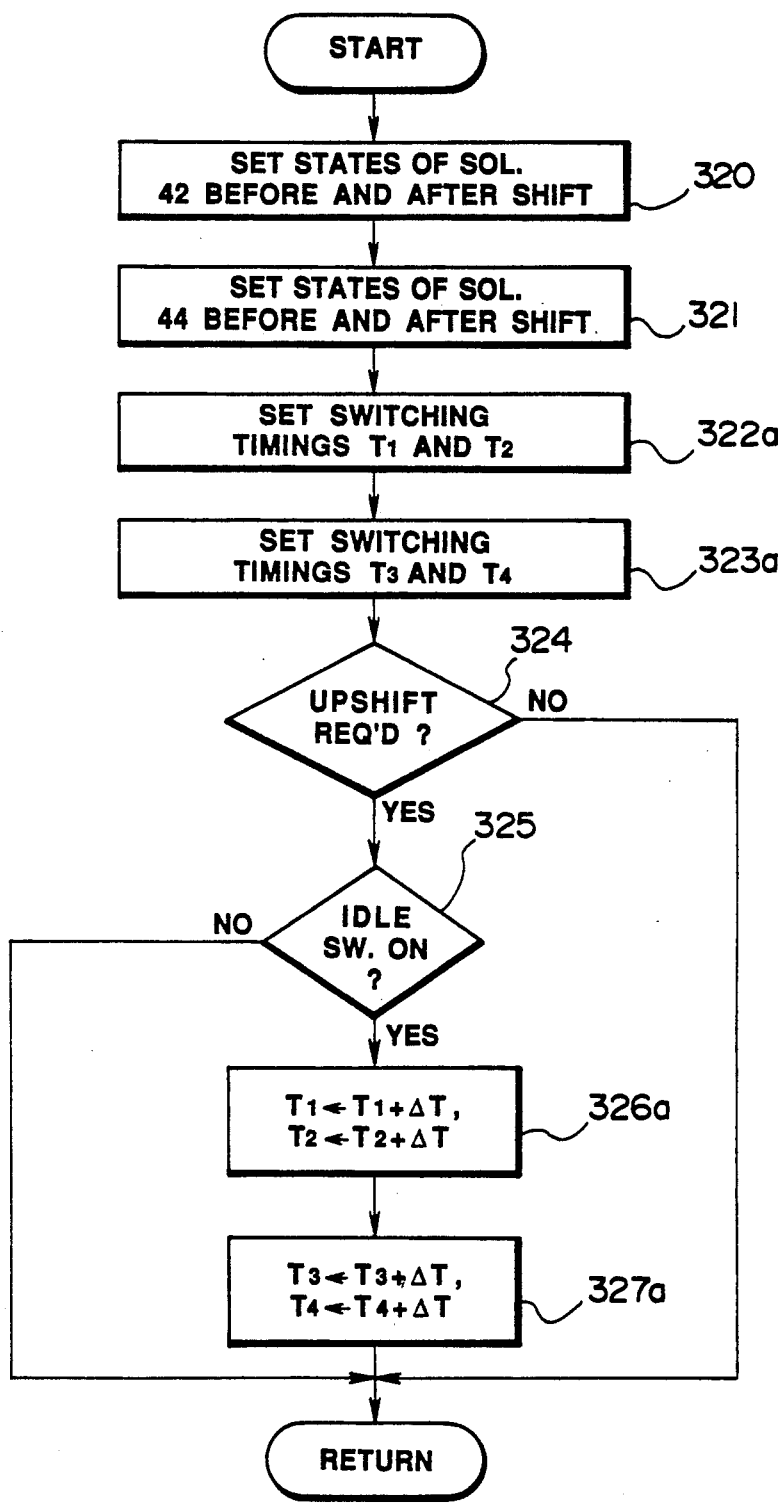
FIG. 13 is a flow diagram of a sub routine of the main routine shown in FIG. 12.

The sub routine of FIG. 13 corresponds to the sub routine of FIG. 5 used in the first embodiment. In FIG. 13, the switching timing data g1, g2, g3, g4 and delta g in the steps 322, 323, 326 and 327 are replaced by switching timing data T1, T2, T3, T4 and delta T in the corresponding steps 322a, 323a, 326a and 327a. The other steps are substantially the same as the steps of FIG. 5. Like numerals have been applied with respect to the equivalent steps of FIG. 5 and the detailed description is omitted to avoid duplicity.

Figure 16:
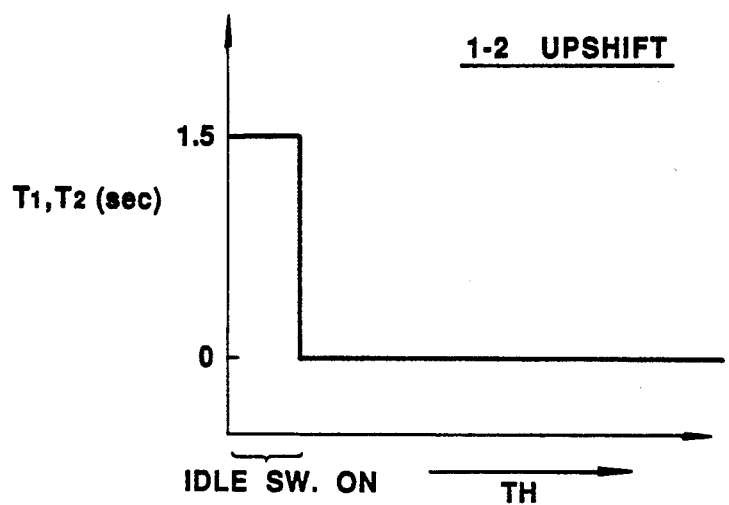
FIGS. 16 and 17 are graphical representations of switching timing data tables for an 1-2 upshift used in the sub routine shown in FIG. 14.
Figure 17:
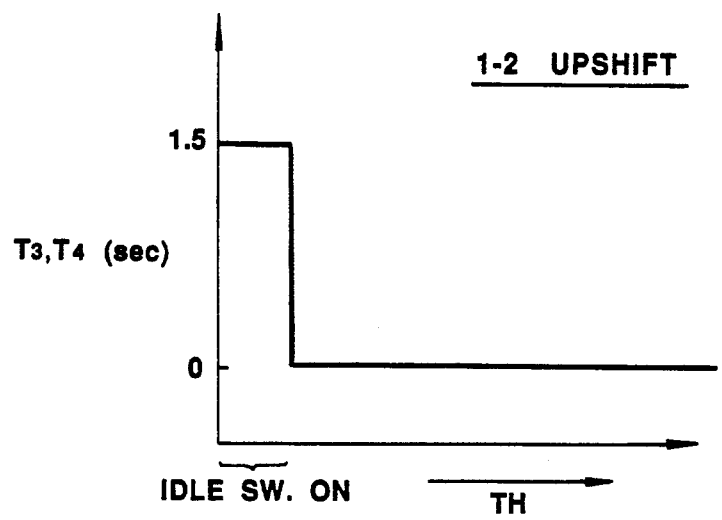

It is to be noted that the switching timing data T1, T2, T3 and T4 are given from the tables of FIGS. 16 and 17.

Figure 14:
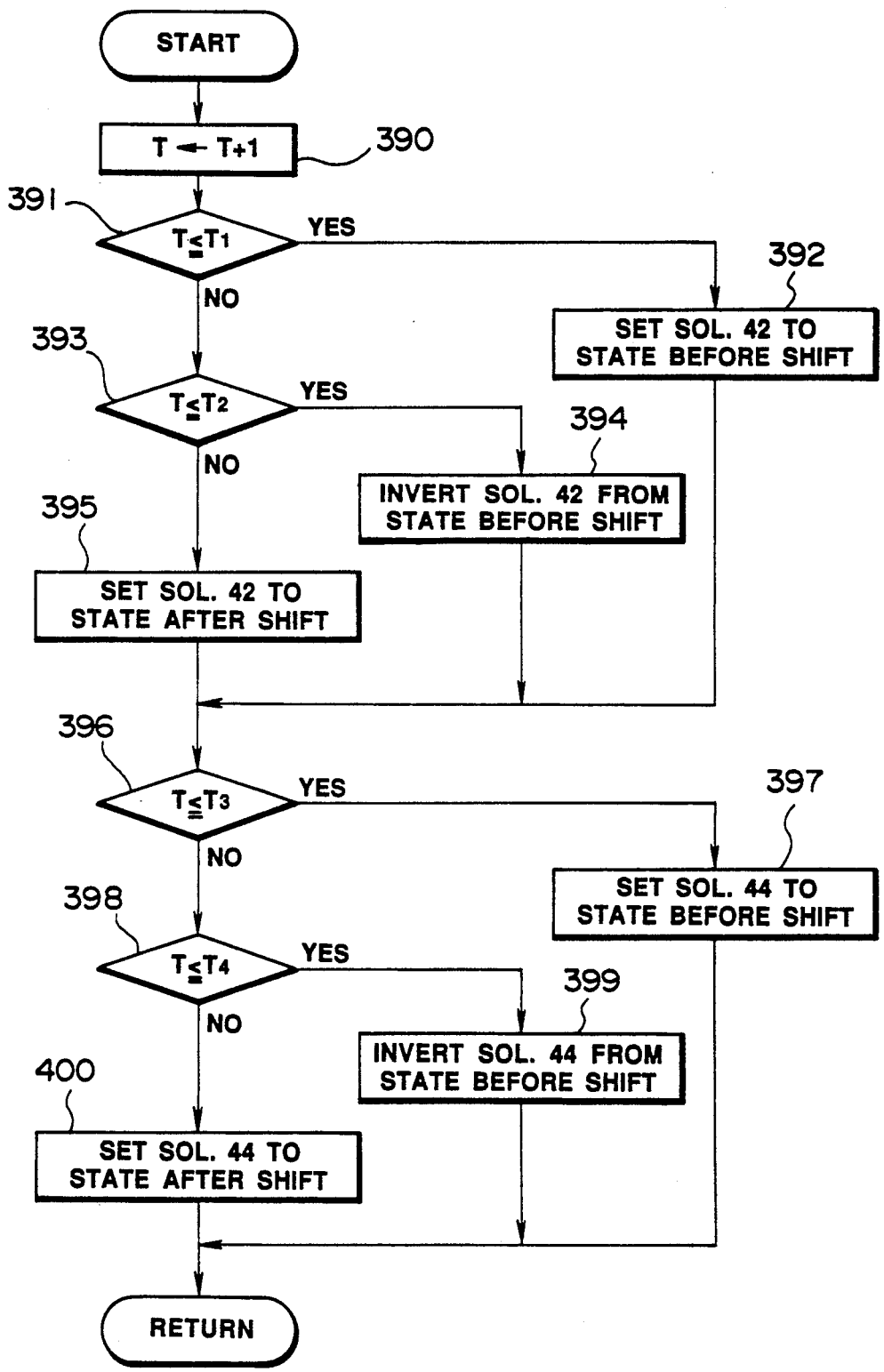
FIG. 14 is a flow diagram of a sub routine of the main routine shown in FIG. 12.

The sub routine of FIG. 14 corresponds to the sub routine of FIG. 6 used in the first embodiment. In step 390 of FIG. 14, the count of the timer T is increased by 1 (one). In the following step 391, a determination is made as to whether or not the count of the timer T is equal to or less than the switching timing value T1. If T is less than or equal to T1, the program proceeds to step 392 where the first shift solenoid 42 is set to the state before the shift required.

If the count of the timer T is greater than the value T1, the program proceeds to step 393 where a determination is made as to whether or not the count of the timer T is less than or equal to the switching timing value T2. If t is less than or equal to T2, the program proceeds to step 394 where the state of the first shift solenoid 42 is inverted from the state before the shift required.

If the count of the timer T is greater than the value T2, the program proceeds to step 395 where the first shift solenoid 42 is set to the state after the shift required. The program proceeds from step 392, 394 or 396 to step 596 where a determination is made as to whether or not the count of the timer T is less than or equal to the switching timing value T3. If T is less than or equal to T3, the program proceeds to step 397 where the second shift solenoid 44 is set to the state before the shift required. Following this, the program ends.

If the count of the timer T is greater than the value T3, the program proceeds to step 398 where a determination is made as to whether or not the count of the timer T is less than or equal to the value T4. If T is less than or equal to T4, the program proceeds to step 399 where the state of the second shift solenoid 44 is inverted from the state before the shift required. Following this, the program ends.

If the count of the timer T is greater than the value T4, the program proceeds to step 400 where the second shift solenoid 44 is set to the state after the shift required. Following this, the program ends.

Figure 15:
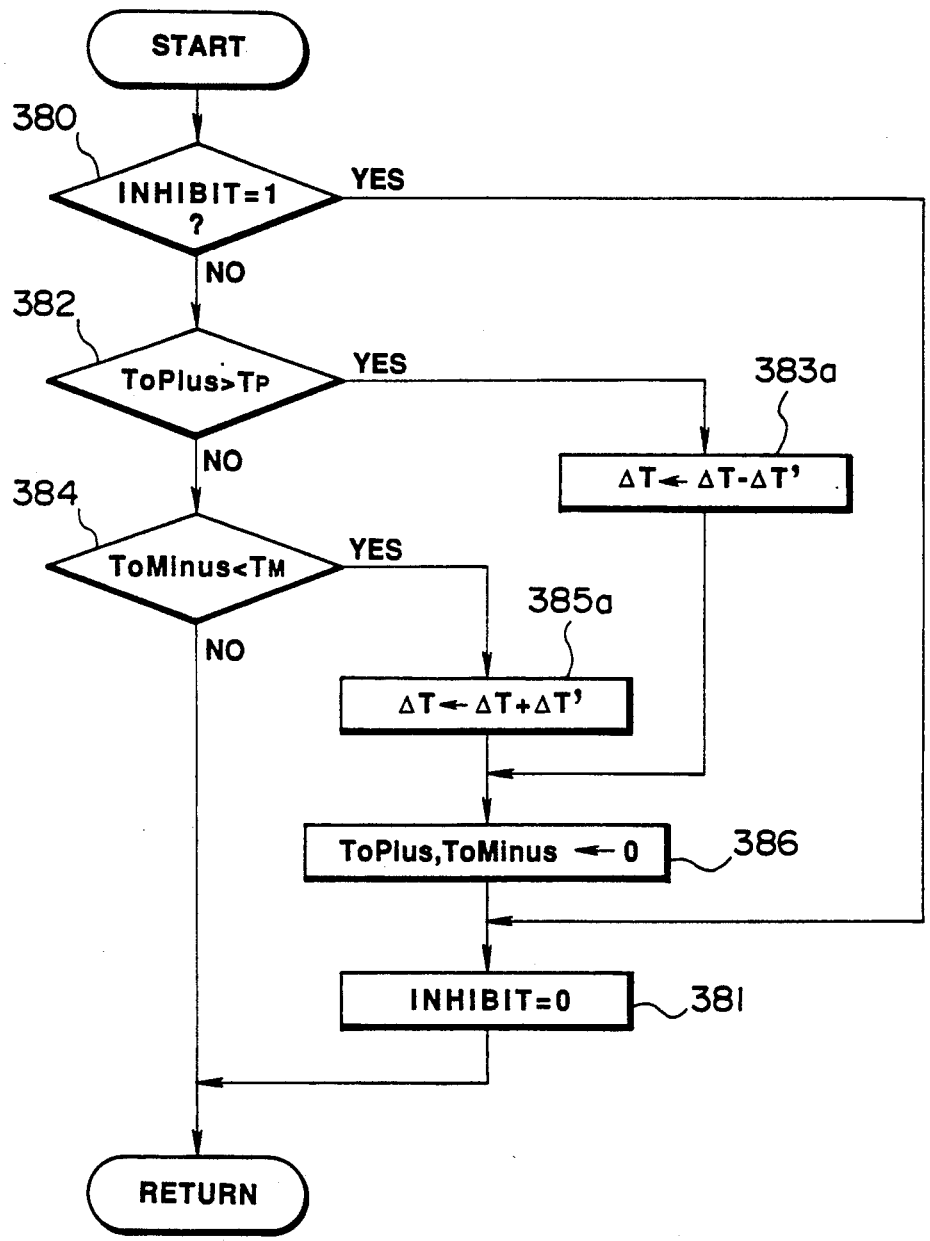
FIG. 15 is a flow diagram of a sub routine of the main routine shown in FIG. 12.

The sub routine of FIG. 15 corresponds to the sub routine of FIG. 8 used in the first embodiment. In this embodiment, delta T and delta T' are used in place of delta g and delta g' used in the steps 383 and 385 of FIG. 8. The other steps are substantially the same as the steps of FIG. 8. Accordingly, like numerals have been applied with respect to the equivalent steps of FIG. 8 and the detailed description is omitted to avoid duplicity.

As is now be understood from the preceding description, the second embodiment can achieve the same effect as obtained in the first embodiment.

Referring to FIGS. 1 to 3, FIGS. 4 to 6, and FIGS. 18 and 19, the third embodiment is described. This third embodiment is substantially the same as the first embodiment except that sub routines of FIGS. 18 and 19 have replaced the sub routines of FIGS. 7 and 8. Specifically, the third embodiment is different from the first embodiment in that the first time derivative of gear ratio G is used in place of the output shaft torque $T_O$, and the first time derivative of gear ratio G is compared with predetermined values delta GM and delta GP to determine whether there occurred a torque peak or a torque down.

Figure 18:
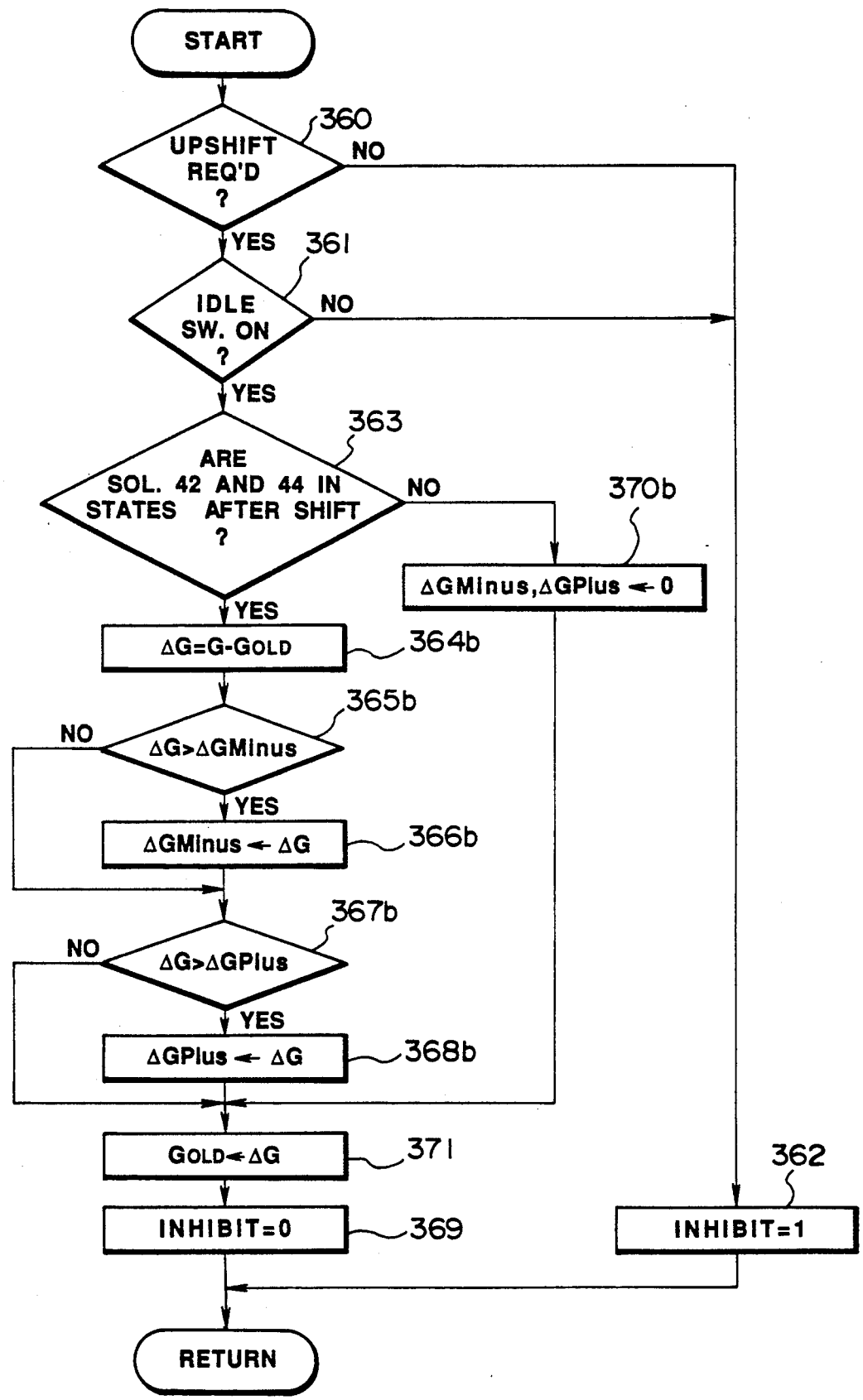
FIG. 18 is a flow diagram of a sub routine used in a third embodiment according to the present invention.
Figure 19:
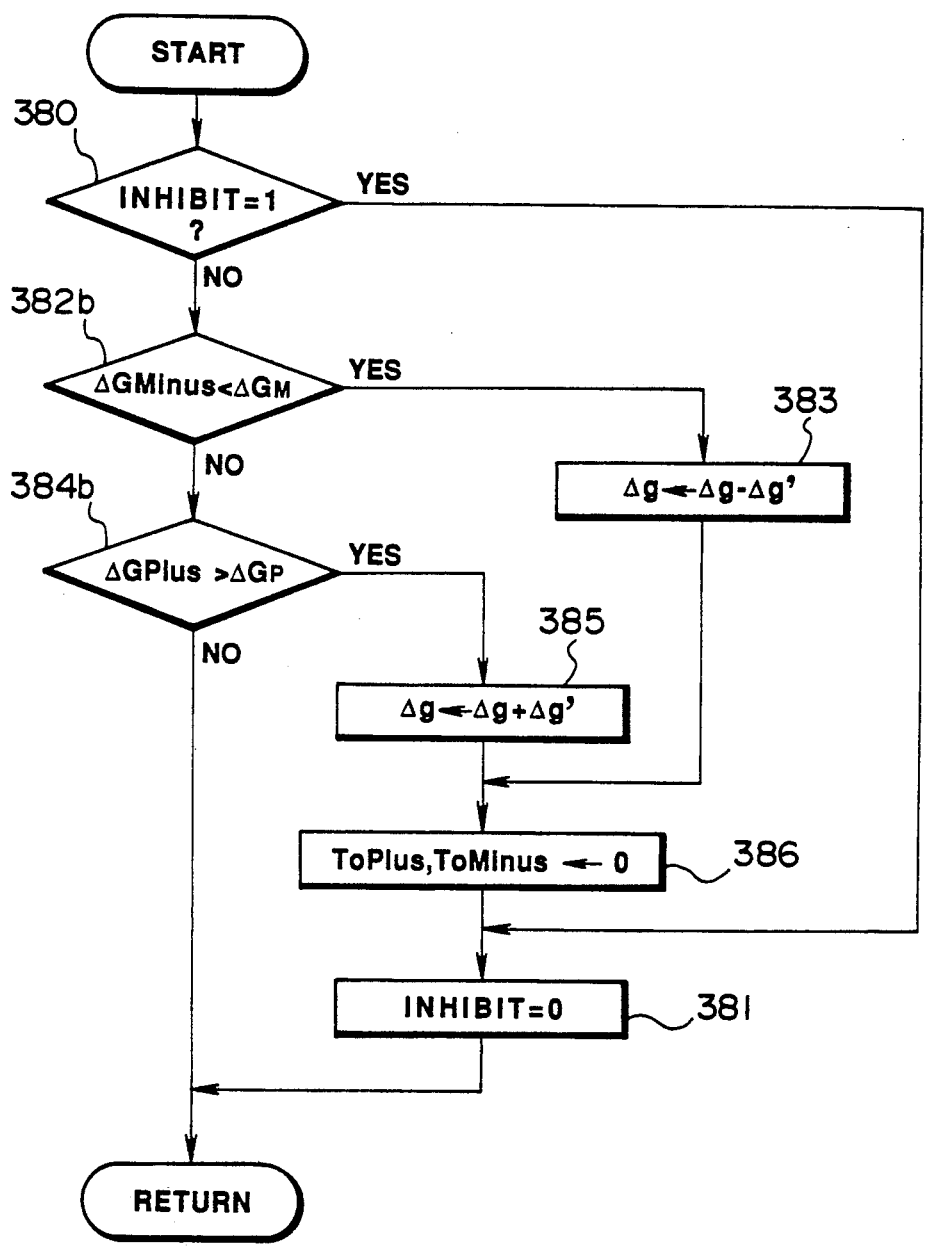
FIG. 19 is a flow diagram of a sub routine used in the third embodiment.

The sub routine of FIG. 18 corresponds to the sub routine of FIG. 7. FIG. 19 is a schematic diagram showing a third embodiment of the invention. In FIG. 18, steps 364b to 370b correspond to the steps 364 to 370 of FIG. 9, respectively. In step 364b, a difference delta G between the new ratio value G and the old ratio value $G_{OLD}$ obtained during the last cycle of execution of the program is calculated. The value "$T_O$" used in FIG. 7 is replaced with the difference "delta G" in the following steps.

In step 365b, a determination is made as to whether or not the difference delta G is less than the value delta GMinus. In step 368b, a determination is made as to whether or not the difference delta G is greater than the value delta GPlus. At the step 368b, the difference delta G is set at delta GPlus. The step 369 follows a newly provided step 371 where a newly detected gear ratio G is set for the last value $G_{OLD}$.

In FIG. 19, the steps corresponding to the steps 382 and 384 are designated by numerals 382b and 384b. In step 382b, a determination is made as to whether or not the value delta GMinus is less than delta GM. In step 384b, a determination is made as to whether or not the value delta GPlus is greater than delta GP. The other steps are substantially the same as the corresponding steps of FIG. 8.

Although in FIG. 19, the control is made by a gear ratio table correction, it is to be noted that the control is not limited to this fashion and may be made by a timer correction as used in the second embodiment.

Figure 20:
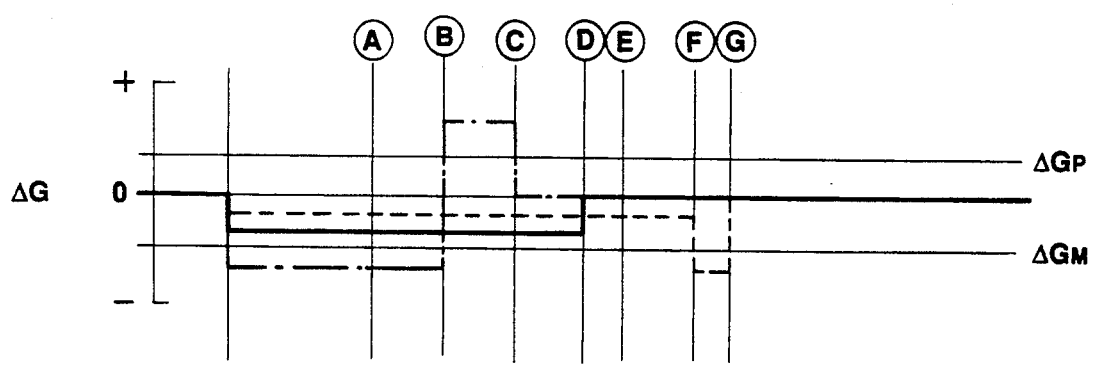
FIG. 20 is a time sequence of first time derivative or rate of gear ratio (delta G).

FIG. 20 shows a time sequence chart of delta G during a power-off 1-2 upshift. In FIG. 20, positions A to G correspond to the position A to G in the time sequence chart of FIG. 11.

Although, in the third embodiment, the switching timing data g1, g2, g3, and g4 are corrected. Alternatively, the switching timing data T1, T2, T3, and T4 may be corrected.

Although, in the previously described embodiments, the switching timings of the shift solenoids have been corrected, the present invention is not limited to these embodiments. For example, the hydraulic fluid pressure used to engage the on-coming friction device may be controlled to optimize the power-off upshift. In this case, the duty ratio of the drive signal outputted to the line pressure solenoid 24 shown in FIG. 2A may be controlled.

What is claimed is:

1. A method of adaptive correction of an inappropriate shift in a motor vehicle automatic transmission, the method comprising the steps of:
   detecting an output torque of the automatic transmission during a power-off upshift and generating an output torque indicative signal indicative of said output torque detected;
   repeating said detecting step during said power-off upshift;
   deriving a maximum from said output torque indicative signals generated during said power-off upshift and generating a maximum indicative signal indicative of said maximum derived;
   deriving a minimum from said output torque indicative signals generated during said power-off upshift and generating a minimum indicative signal indicative of said minimum derived;
   comparing said maximum indicative signal with a first predetermined value and generating a first comparison result indicative signal indicative of a result from comparing said maximum indicative signal with said first predetermined value;
   comparing said minimum indicative signal with a second predetermined value and generating a second comparison result indicative signal indicative of a result from comparing said minimum indicative signal with said second predetermined value; and correcting the progress of shift operation during the next occurrence of a power-off upshift of the same type in accordance with said first and second comparison result indicative signals.

2. A method as claimed in claim 1, wherein said correcting step includes the sub-steps of:

retarding a timing at which an on-coming friction device to be engaged during the next occurrence of a power-off upshift of the same kind is engaged when said first comparison result indicative signal is indicative of a state that said maximum indicative signal is greater than said first predetermined value; and advancing said timing when said second comparison result indicative signal is indicative of a state that said minimum indicative signal is less than said second predetermined value.

3. A method as claimed in claim 1, wherein said correcting step includes the sub-steps of:

effecting a decrement of a target gear ratio value at which an on-coming friction device to be engaged during the next occurrence of a power-off upshift of the same kind is engaged when said first comparison result indicative signal is indicative of a state that said maximum indicative signal is greater than said first predetermined value; and effecting an increment of said target gear ratio value when said second comparison result indicative signal is indicative of a state that said minimum indicative signal is less than said second predetermined value.

4. A method as claimed in claim 1, wherein said correcting step includes the sub-steps of:

effecting a decrement of a count of a timer at which an on-coming friction device to be engaged during the next occurrence of a power-off upshift of the same kind is engaged when said first comparison result indicative signal is indicative of a state that said maximum indicative signal is greater than said first predetermined value; and effecting an increment of said count of said timer when said second comparison result indicative signal is indicative of a state that said minimum indicative signal is less than said second predetermined value.

5. A method of adaptive correction of an inappropriate shift in a motor vehicle automatic transmission having an input shaft and an output shaft, the method comprising the steps of:

detecting a revolution speed of the input shaft of the automatic transmission and generating an input shaft revolution speed indicative signal indicative of said revolution speed of the input shaft detected;

detecting a revolution speed of the output shaft of the automatic transmission and generating an output shaft revolution speed indicative signal indicative of said revolution speed of the output shaft detected;

determining a gear ratio of said input shaft revolution speed to said output shaft revolution speed and generating a gear ratio indicative signal indicative of said gear ratio determined;

deriving a first derivative of said gear ratio indicative signal and generating a first derivative indicative signal indicative of said first derivative derived;

repeating said steps of detecting said revolution speed of the input shaft, detecting said revolution speed of the output shaft, determining said gear ratio and deriving said first derivative during a power-off upshift;

deriving a maximum from said first derivative indicative signals generated during said power-off upshift and generating a maximum indicative signal indicative of said maximum derived;

deriving a minimum from said first derivative indicative signal generated during said power-off upshift and generating a minimum indicative signal indicative of said minimum derived;

comparing said maximum indicative signal with a first predetermined value and generating a first comparison result indicative signal indicative of a result from comparing said maximum indicative signal with said first predetermined value;

comparing said minimum indicative signal with a second predetermined value and generating a second comparison result indicative signal indicative of a result from comparing said minimum indicative signal with said second predetermined value; and correcting the progress of shift operation during the next occurrence of a power-off upshift of the same type in accordance with said first and second comparison result indicative signals.

6. A method as claimed in claim 5, wherein said correcting step includes the sub-steps of:

retarding a timing at which an on-coming friction device to be engaged during the next occurrence of a power-off upshift of the same kind is engaged when said first comparison result indicative signal is indicative of a state that said maximum indicative signal is greater than said first predetermined value; and advancing said timing when said second comparison result indicative signal is indicative of a state that said minimum indicative signal is less than said second predetermined value.

7. A method as claimed in claim 5, wherein said correcting step includes the sub-steps of:

effecting a decrement of a target gear ratio value at which an on-coming friction device to be engaged during the next occurrence of a power-off upshift of the same kind is engaged when said first comparison result indicative signal is indicative of a state that said maximum indicative signal is greater than said first predetermined value; and effecting an increment of said target gear ratio value when said second comparison result indicative signal is indicative of a state that said minimum indicative signal is less than said second predetermined value.

8. A system for an adaptive correction of an inappropriate shift in a motor vehicle automatic transmission, the system comprising:

means for detecting an output torque of the automatic transmission during a power-off upshift and generating an output torque indicative signal indicative of said output torque detected;

a control unit including:

means for repeatedly reading said output torque indicative signals during said power-off upshift;

means for deriving a maximum from said output torque indicative signals read during said power-off upshift and generating a maximum indicative signal indicative of said maximum derived;

means for deriving a minimum from said output torque indicative signals read during said power-off upshift and generating a minimum indicative signal indicative of said minimum derived;

means for comparing said maximum indicative signal with a first predetermined value and generating a first comparison result indicative signal indicative of a result from comparing said maximum indicative signal with said first predetermined value;

means for comparing said minimum indicative signal with a second predetermined value and generating a second comparison result indicative signal indicative of a result from comparing said minimum indicative signal with said second predetermined value;

means for correcting the progress of shift operation during the next occurrence of a power-off upshift of the same type in accordance with said first and second comparison result indicative signal and generating an output signal; and means for initiating engagement of an on-coming friction device to be engaged during said the next occurrence of a power-off upshift of the same type in response to said output signal.

9. A system for an adaptive correction of an inappropriate shift in a motor vehicle automatic transmission having an input shaft and an output shaft, the system comprising:

means for detecting a revolution speed of the input shaft of the automatic transmission and generating an input shaft revolution speed indicative signal indicative of said revolution speed of the input shaft detected;

means for detecting a revolution speed of the output shaft of the automatic transmission and generating an output shaft revolution speed indicative signal indicative of said revolution speed of the output shaft detected;

a control unit including;

means for determining a gear ratio of said input shaft revolution speed to said output shaft revolution speed and generating a gear ratio indicative signal indicative of said gear ratio determined;

means for deriving a first derivative of said gear ratio indicative signal and generating a first derivative indicative signal indicative of said first derivative derived;

means for deriving a maximum from said first derivative indicative signals generated during said power-off upshift and generating a maximum indicative signal indicative of said maximum derived;

means for deriving a minimum from said first derivative indicative signals generated during said power-off upshift and generating a minimum indicative signal indicative of said minimum derived;

means for comparing said maximum indicative signal with a first predetermined value and generating a first comparison result indicative signal indicative of a result from comparing said maximum indicative signal with said first predetermined value;

means for comparing said minimum indicative signal with a second predetermined value and generating a second comparison result indicative signal indicative of a result from comparing said minimum indicative signal with said second predetermined value;

means for correcting the progress of shift operation during the next occurrence of a power-off upshift of the same type in accordance with said first and second comparison result indicative signals and generating an output signal; and means for initiating engagement of an on-coming friction device to be engaged during said the next occurrence of a power-off upshift of the same type in response to said output signal.

10. A method of adaptive correction of an inappropriate shift in a motor vehicle automatic transmission, the method comprising the steps of:

(A) deriving information regarding a variation in an output torque of the automatic transmission during a first power-off upshift of the automatic transmission; and (B) correcting the timing of the initiation of an engagement of an oncoming friction device during a second power-off upshift, of the same type as the first power-off upshift, during the occurrence of the second power-off upshift in accordance with the information derived in the step (A).

11. A system for an adaptive correction of an inappropriate shift in a motor vehicle automatic transmission, said system comprising:

(A) means for deriving a variation in an output torque of an output shaft of said automatic transmission during a first power-off upshift of said automatic transmission;

(B) means for effecting an engagement of an oncoming friction device during said first power-off upshift; and (C) a control unit including means for deciding, based on the variation in output torque derived by said means (A), whether or not said first power-off upshift has been effected in a predetermined, appropriate manner, and means for correcting the timing at which said oncoming friction device is initially engaged during the next occurrence of a power-off upshift of the same type as said first power-off upshift in accordance with the derived variation in output torque.

* * * * *